(12) United States Patent
Landestorp et al.

(10) Patent No.: US 11,371,555 B2
(45) Date of Patent: Jun. 28, 2022

(54) TRANSMISSION INPUT SHAFT ARRANGEMENT

(71) Applicant: VOLVO TRUCK CORPORATION, Gothenburg (SE)

(72) Inventors: Josef Landestorp, Lerum (SE); Kjell Haraldsson, Sexdrega (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 153 days.

(21) Appl. No.: 16/760,309

(22) PCT Filed: Nov. 10, 2017

(86) PCT No.: PCT/EP2017/078841
§ 371 (c)(1),
(2) Date: Apr. 29, 2020

(87) PCT Pub. No.: WO2019/091564
PCT Pub. Date: May 16, 2019

(65) Prior Publication Data
US 2020/0271157 A1 Aug. 27, 2020

(51) Int. Cl.
| F16D 11/14 | (2006.01) |
| F16C 19/36 | (2006.01) |
| B60K 17/02 | (2006.01) |
| F16C 33/58 | (2006.01) |
| F16F 15/30 | (2006.01) |
| F16H 57/021 | (2012.01) |

(52) U.S. Cl.
CPC ............ *F16C 19/361* (2013.01); *B60K 17/02* (2013.01); *F16C 33/58* (2013.01); *F16D 11/14* (2013.01);
(Continued)

(58) Field of Classification Search
CPC .... F16C 19/361; F16C 33/58; F16C 2361/43; B60K 17/02; F16F 15/30; F16H 57/021; F16D 11/14
See application file for complete search history.

(56) References Cited

U.S. PATENT DOCUMENTS

| 5,269,607 | A | 12/1993 | Lawson |
| 2004/0165805 | A1* | 8/2004 | Kanehisa ............... B60B 1/041 384/545 |

(Continued)

FOREIGN PATENT DOCUMENTS

| CN | 1485223 A | 3/2004 |
| CN | 1789762 A | 6/2006 |

(Continued)

OTHER PUBLICATIONS

China Office Action dated Feb. 23, 2021 in corresponding China Patent Application No. 201780096627.3, 14 pages.
(Continued)

*Primary Examiner* — Huan Le
(74) *Attorney, Agent, or Firm* — Venable LLP; Jeffri A. Kaminski (57) ABSTRACT

The present invention relates to a transmission input shaft arrangement (100) for a vehicle transmission, the transmission input shaft arrangement comprising an input shaft (102); a clutch arrangement (104) and a bearing arrangement (106) arranged at a position spaced apart from the clutch arrangement (104). The bearing arrangement (106) comprises a bearing inner ring (108) rotationally connected to the clutch arrangement (104).

13 Claims, 6 Drawing Sheets

(52) U.S. Cl.
CPC ........... *F16F 15/30* (2013.01); *F16H 57/021* (2013.01); *F16C 2361/43* (2013.01)

(56) References Cited

U.S. PATENT DOCUMENTS

2007/0253657 A1 11/2007 Casey et al.
2008/0144986 A1 6/2008 Wajda et al.
2013/0257005 A1 10/2013 Schumacher

FOREIGN PATENT DOCUMENTS

| CN | 201382085 | Y | | 1/2010 | |
|---|---|---|---|---|---|
| CN | 102458879 | A | | 5/2012 | |
| CN | 102588463 | A | * | 7/2012 | ......... F16D 25/0635 |
| CN | 102588463 | A | | 7/2012 | |
| CN | 205136366 | U | | 4/2016 | |
| CN | 206180768 | U | | 5/2017 | |
| DE | 4307830 | A1 | | 9/1993 | |
| JP | 2003148484 | A | | 5/2003 | |
| JP | 2008189212 | A | | 8/2008 | |
| JP | 2013060194 | A | | 4/2013 | |

OTHER PUBLICATIONS

International Search Report and Written Opinion dated Sep. 11, 2018 in corresponding International PCT Application No. PCT/EP2017/078841, 8 pages.

\* cited by examiner

TRANSMISSION INPUT SHAFT ARRANGEMENT

CROSS-REFERENCE TO RELATED APPLICATIONS

This application is a U.S. National Stage application of PCT/EP2017/078841, filed Nov. 10, 2017 and published on May 16, 2019 as WO 2019/091564 A1, all of which is hereby incorporated by reference in its entirety.

TECHNICAL FIELD

The present invention relates to a transmission input shaft arrangement. The invention also relates to a vehicle comprising a vehicle transmission comprising such a transmission input shaft arrangement. The invention is applicable on vehicles, in particularly low/light, medium and heavy duty vehicles commonly referred to as trucks. Although the invention will mainly be described in relation to a truck, it may also be applicable for other types of vehicles such as e.g. working machines, buses, etc.

BACKGROUND

In connection to low/light-, medium and heavy duty vehicles, also commonly referred to as trucks, a transmission arrangement is connected to a prime mover for controlling torque loads from the prime mover to the propelled wheels of the truck. Hereby, a variety of ratios between the input shaft and the output shaft of the transmission arrangement can be obtained.

The transmission arrangement is conventionally connected to an output shaft of the prime mover via a flywheel and a clutch arrangement. In detail, torque loads from the prime mover are provided to the flywheel. For transmitting the torque loads from the flywheel to the input shaft, the clutch arrangement is arranged in an engaged state, whereby torque loads can be further directed through the transmission.

Moreover, the transmission arrangement most often comprises a bearing arrangement between the flywheel and the input shaft for supporting the flywheel at the end portion of the input shaft. During assembly of the transmission arrangement to the engine, the bearing arrangement is preferably fixedly connected to the flywheel. Hence, the bearing outer ring is fixedly connected to the flywheel. Thereafter, the flywheel/bearing assembly is connected to the input shaft.

A problem with the above procedure is that the bearing inner ring cannot be fixedly connected to the input shaft. This may in turn cause a possible relative rotation between the bearing inner ring of the bearing arrangement and the input shaft. Such situation may arise when the flywheel is rotating and the clutch arrangement is arranged in a disconnected state, i.e. when there is a speed difference between the flywheel and the input shaft. Such relative rotation between the bearing inner ring and the input shaft may in turn cause wear on the bearing arrangement as well as the input shaft.

According to its abstract, DE 43 07 830 describes that a sleeve-like section engages over the outer race and is connected to an annular section, which extends on the axial side of the bearing radially towards the inner race. Further, J P 2003 148484 describes in its abstract a bearing device capable of effectively restricting wear in each part. Moreover, JP 203 060194 describes in its abstract a bearing device for a wheel which includes an inner ring member including an inner shaft and an inner ring constituent member.

There is thus a desire to reduce the relative rotation between such bearing and the input shaft of a transmission arrangement.

SUMMARY

It is an object of the present invention to provide a transmission input shaft arrangement which at least partially overcomes the above described deficiencies. This is achieved by a transmission input shaft arrangement according to claim 1.

According to a first aspect, there is provided a transmission input shaft arrangement for a vehicle transmission, the transmission input shaft arrangement comprising an input shaft; a clutch arrangement connected to the input shaft and controllable between a first state in which the input shaft is drivingly connected to an output shaft of a prime mover, and a second state in which the input shaft is disconnected from the output shaft of the prime mover; and a bearing arrangement comprising a bearing inner ring connected to the input shaft and arranged at a position spaced apart from the clutch arrangement in the longitudinal direction of the input shaft, wherein the bearing inner ring is rotationally connected to the clutch arrangement.

The bearing inner ring should be construed as an inner radially positioned bearing ring. The bearing inner ring preferably comprises an inner raceway at which roller elements of the bearing can be provided. The present disclosure should not be construed as limited to any specific type of bearing arrangement.

Moreover, the wording "clutch arrangement connected to the input shaft" may also be understood as a portion of the clutch arrangement being fixedly connected, at least in the rotational direction, to the input shaft. Hence, one connecting member of the clutch arrangement is preferably fixedly connected in the rotational direction to the input shaft.

An advantage is that the bearing arrangement can be loosely connected to the input shaft while still being prevented from rotating relative to the clutch arrangement. As the clutch arrangement comprises a portion rotationally connected to the input shaft, a mutual rotation between the bearing inner ring and the input shaft is thus also prevented. Reduced wear on the bearing arrangement as well as the input shaft is thus achieved. Also, a relatively simple assembly of the bearing arrangement to the input shaft is achieved. There are different approaches of rotationally connecting the bearing inner ring to the clutch arrangement, which will be described further below. The wording "rotationally connected" should thus be understood such that a mutual rotation between the bearing inner ring and the clutch arrangement is prevented. Accordingly, no additional rotational fixation of the inner bearing ring to the input shaft is required as the bearing ring instead is connected to the clutch arrangement. This will also reduce the risk of accidentally damaging the bearing arrangement during assembly thereof.

According to an example embodiment, the input shaft may comprise an outwardly facing input shaft gear teeth arrangement arranged in meshed connection with the inwardly facing gear teeth arrangement of the clutch arrangement.

According to an example embodiment, the transmission input shaft arrangement may further comprise a vehicle flywheel arrangement, the flywheel arrangement being connectable to the output shaft of the prime mover and arranged to transmit a torque from the output shaft of the prime mover to the input shaft via the clutch arrangement.

According to an example embodiment, the bearing arrangement may be connected between the input shaft and the vehicle flywheel arrangement.

Hence, a meshed connection, as will be described further below, between an outwardly facing gear teeth arrangement of the bearing inner ring and an inwardly facing gear teeth arrangement of the clutch arrangement may prevent a relative rotation of the bearing inner ring and the input shaft when the input shaft is disconnected from the output shaft of the prime mover.

According to an example embodiment, the bearing arrangement may comprise a bearing outer ring, the bearing outer ring being press-fitted to the vehicle flywheel arrangement. Hereby, a tight fit is provided. Also, the connection between the flywheel arrangement and the bearing arrangement can be made in advance, where after the flywheel/bearing assembly is connected to the input shaft.

According to an example embodiment, the bearing inner ring may comprise a longitudinally extending elongated portion extending from an outer end portion of the input shaft to a position radially below a portion of the clutch arrangement, wherein the longitudinally extending elongated portion comprises an outwardly facing gear teeth arrangement arranged in meshed connection with an inwardly facing gear teeth arrangement of the clutch arrangement.

The wording inwardly and outwardly facing gear teeth should be construed as seen in the radial direction. Hence, inwardly facing gear teeth are facing radially inwardly, while outwardly facing gear teeth are facing radially outwardly.

Furthermore, providing the bearing inner ring with outwardly facing gear teeth in meshed connection with inwardly facing gear teeth of the clutch arrangement will prevent the relative rotation without the need of tightly fixate the bearing inner ring to the input shaft, which is most often associated with the use of narrow tolerances achieved by expensive machining.

Accordingly, the outwardly facing gear teeth of the bearing inner ring and the outwardly facing gear teeth of the input shaft may be arranged in meshed connection with the same inwardly facing gear teeth arrangement of the clutch arrangement, although at different axial positions. The inwardly facing gear teeth arrangement of the clutch arrangement may thus preferably extend an axial distance from the connection to the outwardly facing gear teeth arrangement of the input shaft.

Also, the flywheel arrangement can be arranged at a sufficient distance from the clutch arrangement while still enabling the connection between the bearing inner ring and the clutch arrangement.

According to an example embodiment, the outwardly facing gear teeth arrangement of the bearing inner ring may form an axially arranged inner portion of the bearing inner ring, wherein a longitudinal extension of the axially arranged inner portion forms less than 50% of a longitudinal extension of the bearing inner ring.

According to an example embodiment, the longitudinal extension of the axially arranged inner portion may form at least 25% of the longitudinal extension of the bearing inner ring.

Hereby, a sufficient connection between the outwardly facing gear teeth arrangement of the bearing inner ring and the inwardly facing gear teeth arrangement of the clutch arrangement can be achieved.

According to an example embodiment, the bearing arrangement may be positioned at an outer end position of the input shaft.

According to an example embodiment, the bearing inner ring may be non-fixedly connected to the input shaft for allowing a mutual rotation between the inner bearing and the input shaft.

The wording "non-fixedly connected" should be construed such that the bearing inner ring would be allowed to rotate relative the input shaft if not rotationally connected to the clutch arrangement. The bearing inner ring is thus rotationally non-fixedly connected to the input shaft.

According to an example embodiment, the transmission input shaft arrangement may further comprise a longitudinally extending sleeve portion connected to the bearing inner ring, wherein the longitudinally extending sleeve portion comprises an outwardly facing gear teeth arrangement arranged in meshed connection with an inwardly facing gear teeth arrangement of the clutch arrangement.

The longitudinally extending sleeve portion may preferably be fixedly connected, at least in the rotational direction to the bearing inner ring. An effect of the longitudinally extending sleeve portion is that the bearing inner ring itself needs no substantial design modification. Also, the sleeve may be provided from a material which is cheaper to produce in comparison to the material of the bearing inner ring.

According to an example embodiment, the longitudinally extending sleeve portion may be press-fitted to the bearing inner ring.

According to an example embodiment, the outwardly facing gear teeth arrangement and the inwardly facing gear teeth arrangement of the clutch arrangement may comprise respective gear teeth, wherein each gear tooth is formed in a spline shaped configuration.

A spline connection is advantageous as it can efficiently transmit torque loads between the parts it connects.

According to a second aspect, there is provided a vehicle comprising a vehicle transmission and a prime mover arranged to provide a propelling torque to the vehicle transmission, wherein the vehicle transmission comprises a transmission input shaft arrangement according to any one of the embodiments described above in relation to the first aspect.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference characters refer to like elements throughout the description.

Figure 1:
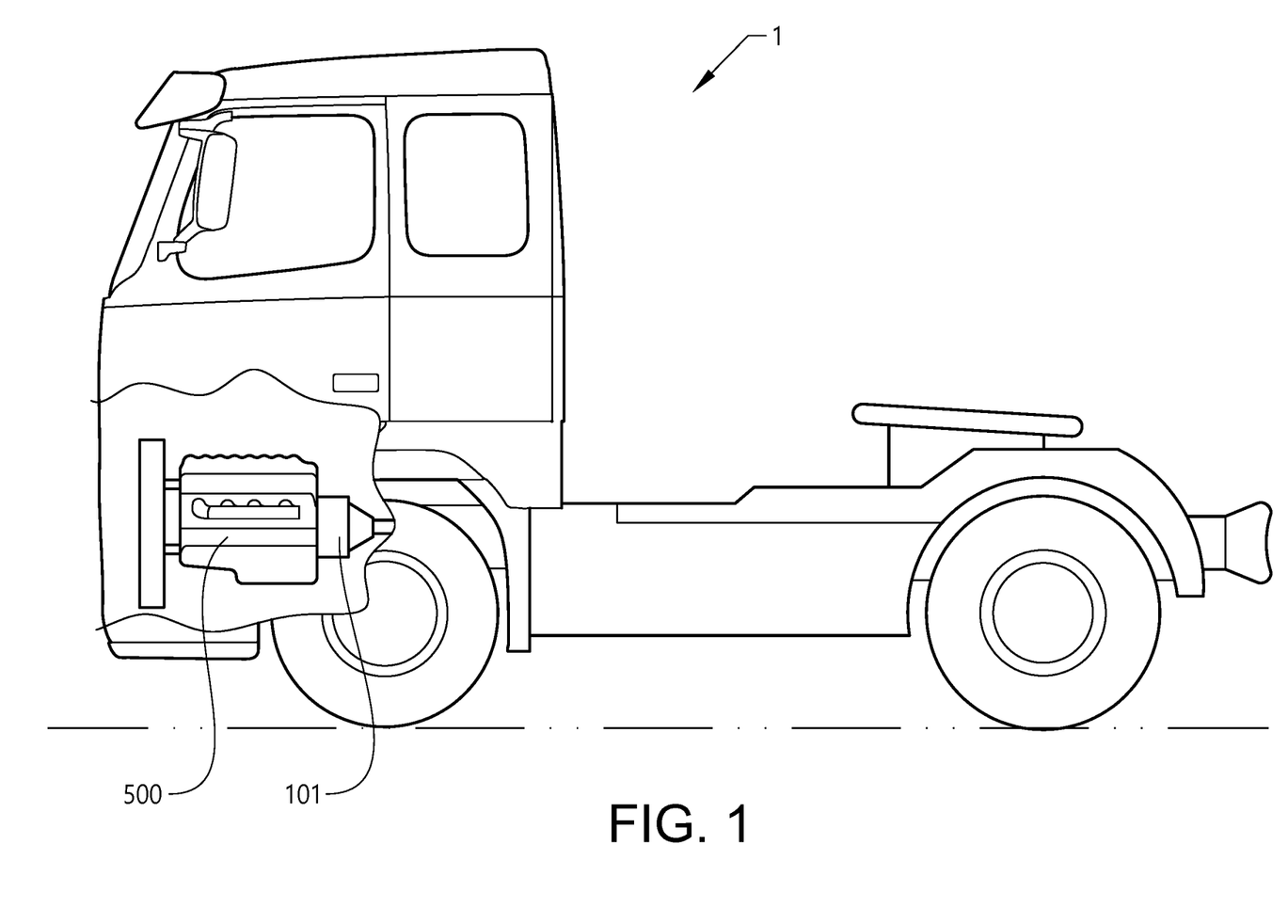
FIG. 1 is a lateral side view illustrating an example embodiment of a vehicle in the form of a truck.

With particular reference to FIG. 1, there is provided a vehicle 1 in the form of a truck. The vehicle 1 comprises a prime mover 500 in the form of an internal combustion engine arrangement 500, and a vehicle transmission 101 connected to the prime mover 500. The vehicle 1 in FIG. 1 is particularly suitable for utilizing a vehicle transmission 101 described below in relation to the description of FIG. 2.

Figure 2:
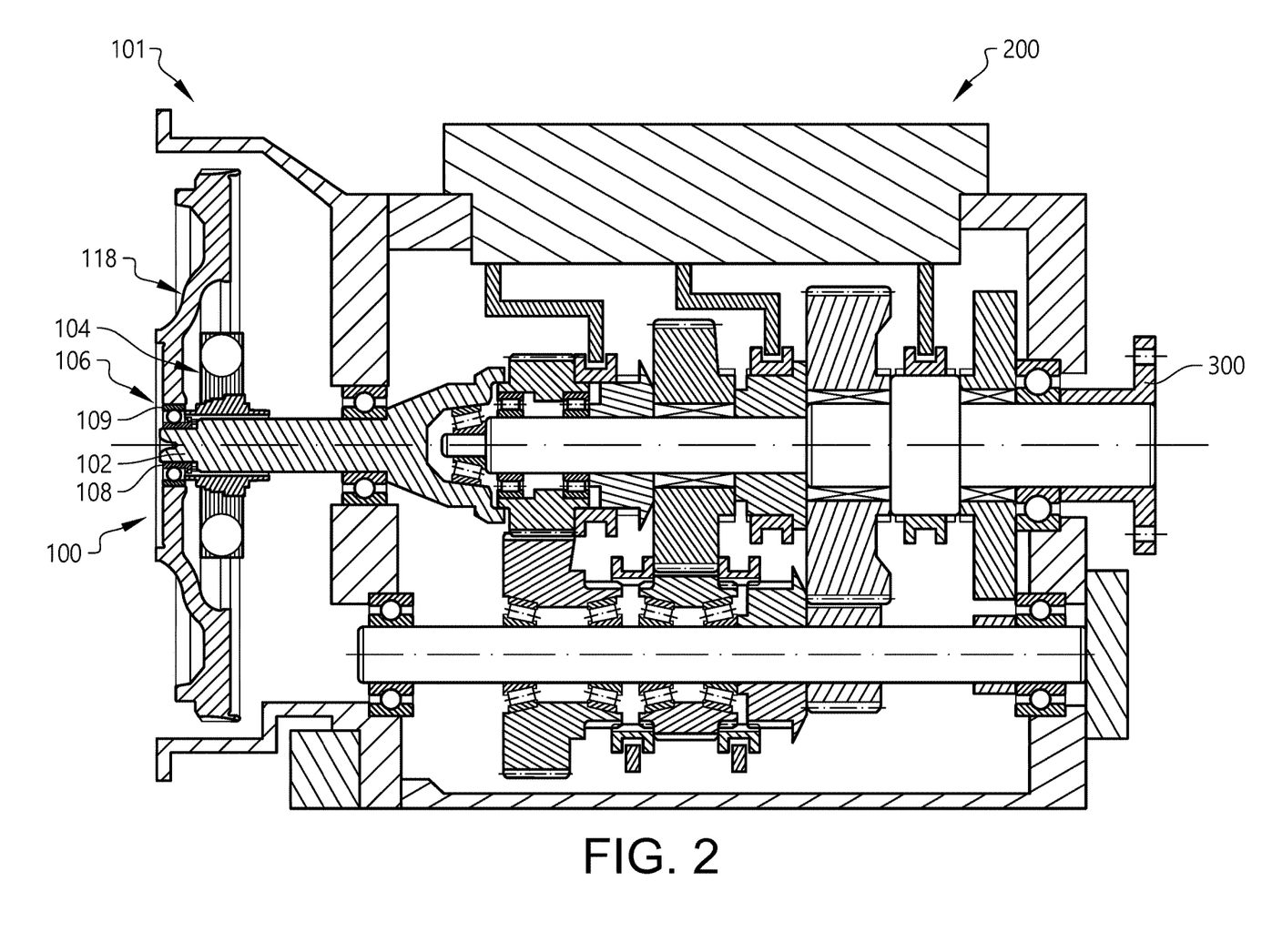
FIG. 2 is a schematic illustration of a vehicle transmission according to an example embodiment.

Reference is therefore made to FIG. 2, which illustrate a vehicle transmission 101 according to an example embodiment. The vehicle transmission is arranged within a transmission housing 200. Furthermore, the vehicle transmission 101 comprises an input shaft 102 arranged to receive a torque from the prime mover (see 500 in FIG. 1). The torque from the prime mover is transmitted through the vehicle transmission 101 and out from the vehicle transmission at an output shaft 300. By means of the gear wheels in the vehicle transmission 101, a plurality of gear stages are obtainable for achieving various ratios between the input shaft 102 and the output shaft 300.

Moreover, the vehicle transmission 101 comprises a transmission input shaft arrangement 100. In particular, the transmission input shaft arrangement 100 comprises the above described input shaft 102, a clutch arrangement 104 and a bearing arrangement 106. The transmission input shaft arrangement 100 may also preferably comprise a flywheel arrangement 118 which is connectable to an output shaft (not shown) of the prime mover 500. The flywheel arrangement 118 is connected to the input shaft via the bearing arrangement 106 at an outer end position of the input shaft 102. Preferably, a bearing outer ring 109 of the bearing arrangement 106 is press-fitted to the flywheel arrangement 118, while a bearing inner ring 108 of the bearing arrangement 106 is loosely connected to the input shaft 102. By loosely connected should be understood that some geometric play is present between the contact surfaces of the input shaft 102 and the bearing inner ring 108.

When transmitting torque from the prime mover 500 to the vehicle transmission 101, the flywheel 118 rotates and the clutch arrangement 104 is arranged in a connected state in which the input shaft 102 is drivingly connected to the flywheel arrangement 118, and in turn to the output shaft of the prime mover. Hereby, the input shaft 102 will rotate, preferably at substantially the same rotational velocity as the flywheel arrangement 118, for transmitting torque into the vehicle transmission 101.

On the other hand, when the vehicle transmission 101 is disconnected from the prime mover 500, the clutch arrangement 104 is arranged in a disconnected state in which the input shaft 102 is disconnected from the flywheel arrangement 118. In this state, the flywheel arrangement 118 rotates relative to the input shaft 102. In detail, the bearing outer ring 109 rotates together with the flywheel arrangement 118.

In the latter situation, i.e. when the clutch arrangement 104 is arranged in the disconnected state, there is thus a speed difference between the rotational velocity of the input shaft 102 and the rotational velocity of the flywheel arrangement 118. Due to this relative rotation, and the fact that the bearing inner ring 108 is connected to the input shaft 102 with the above described geometric play, there is a risk that the bearing inner ring 108 will rotate relative to the input shaft 102, i.e. a mutual displacement between the bearing inner ring 108 and the input shaft 102 may arise. This may cause wear on components, such as the contact surfaces of the bearing inner ring 108 and the input shaft 102, etc.

Figure 3A:
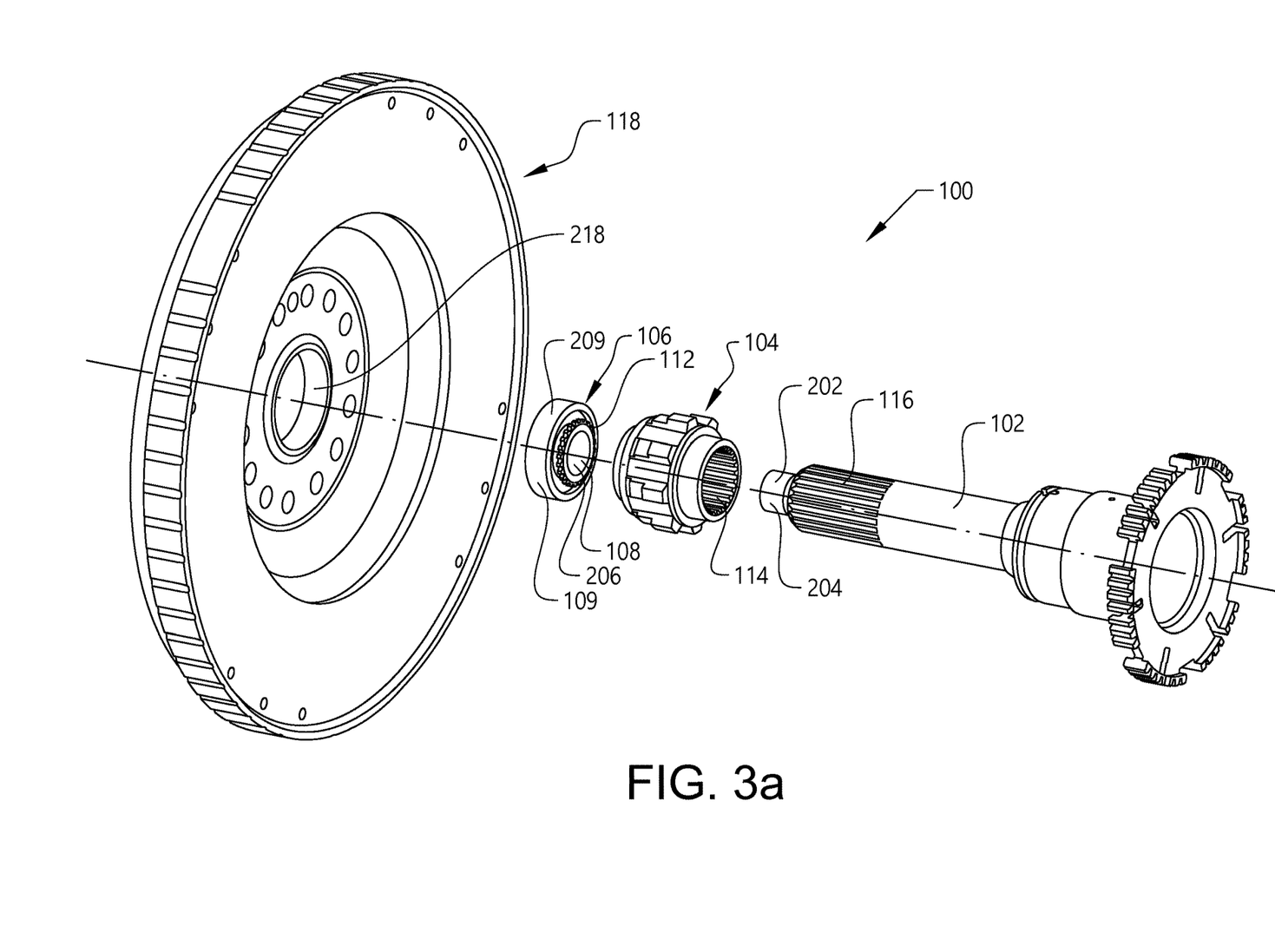
FIGS. 3a-3b illustrate a transmission input shaft arrangement according to an example embodiment.
Figure 3B:
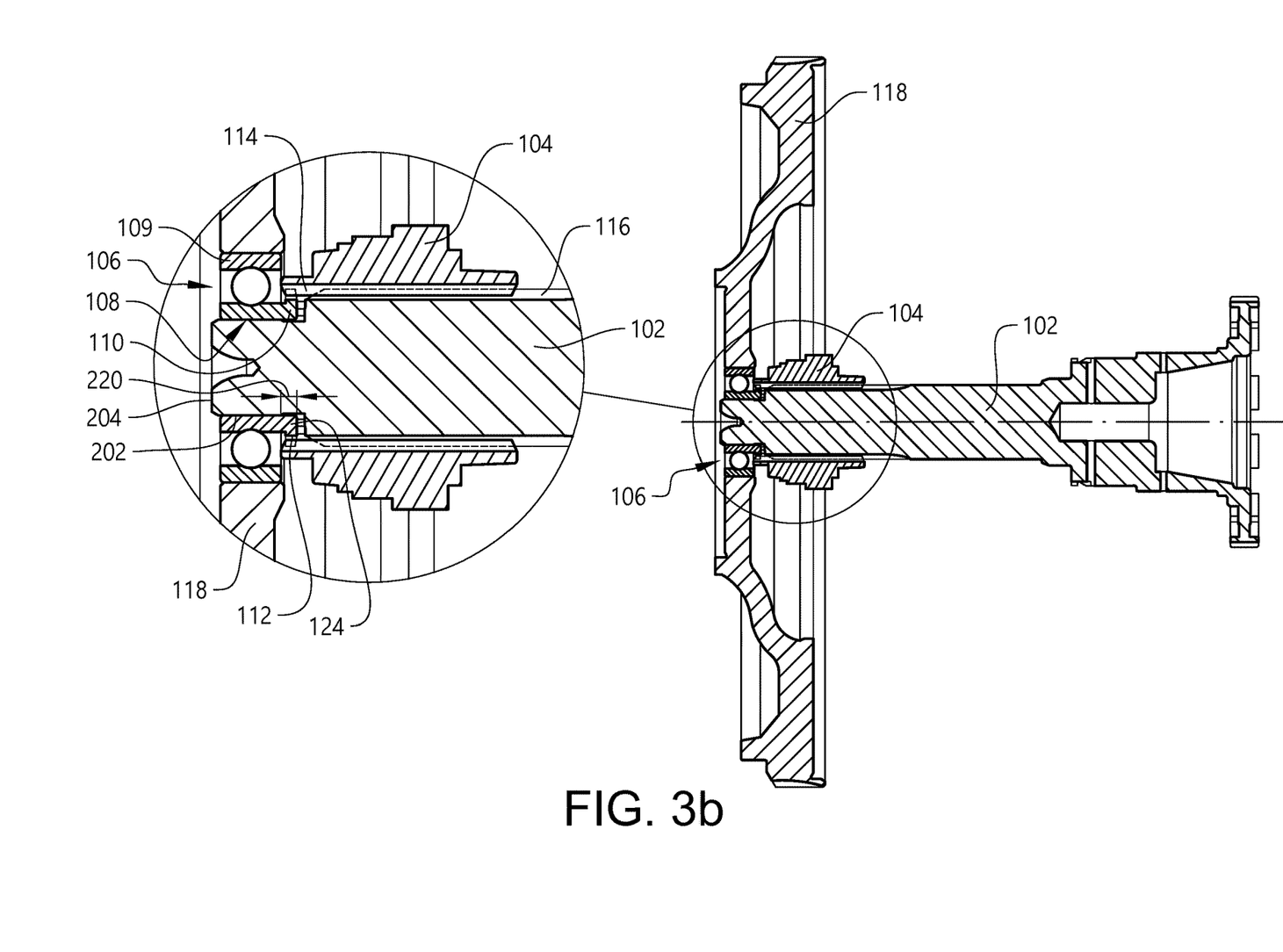

A solution to such problem is depicted in detail in FIGS. 3a-4b, which illustrate two example embodiments of a transmission input shaft arrangement 100, of which the solution in FIGS. 3a-3b is illustrated without reference numerals in FIG. 2. Reference is firstly made to FIGS. 3a-3b, where FIG. 3a is an exploded view of the transmission input shaft arrangement 100 according to a first example embodiment, and where FIG. 3b is a cross-section of the transmission input shaft arrangement 100 in FIG. 3a in an assembled configuration.

As can be seen in FIGS. 3a-3b, the transmission input shaft arrangement 100 comprises, as also described above, the input shaft 102, the flywheel arrangement 118, the bearing arrangement 106 and the clutch arrangement 104. The clutch arrangement 104 is depicted simply by a clutch hub for simplicity of understanding. The clutch hub thus forms part of the clutch arrangement 104 whereby the following will only refer to it as the clutch arrangement 104.

Furthermore, the input shaft 102 comprises an outwardly facing input shaft gear teeth arrangement 116. The outwardly facing input shaft gear teeth arrangement 116 is preferably formed in a spline shaped configuration. The clutch arrangement 104 on the other hand comprises an inwardly facing gear teeth arrangement 114, also preferably formed in a spline shaped configuration. In a connected state, as depicted in FIG. 3b, the outwardly facing input shaft gear teeth arrangement 116 of the input shaft 102 is arranged in meshed connection with the inwardly facing gear teeth arrangement 114 of the clutch arrangement 104.

Still further, the input shaft 102 comprises a bearing connecting surface 202 arranged at an outer end 204 of the input shaft 102. The bearing arrangement 106 is arranged to be connected to the input shaft 102 at the bearing connecting surface 202. In detail, an inner surface 206 of the bearing inner ring 108 is connected to the bearing connecting surface 202 of the input shaft 102. As described above, some geometric play is provided between the inner surface 206 of the bearing inner ring 108 and the bearing connecting surface 202 of the input shaft 102.

Moreover, the bearing outer ring 109 of the bearing arrangement 106 is connected to the flywheel arrangement 118. In detail, the bearing outer ring 109 is preferably fixedly connected to the flywheel arrangement 118, preferably by press-fitting an outer surface 209 of the bearing outer ring 109 and an inner flywheel surface 218 of the flywheel arrangement 118 to each other.

With particular reference to the bearing arrangement 106, the bearing inner ring 108 comprises a longitudinally extending elongated portion 110. The longitudinally extending elongated portion 110 thus extends in the axial direction in a direction from the flywheel arrangement 118 towards the clutch arrangement 104. The longitudinally extending elongated portion 110 comprises an outwardly facing gear teeth arrangement 112 at an end portion thereof. The outwardly facing gear teeth arrangement 112 of the bearing inner ring 108 is preferably formed in a spline shaped configuration. Moreover, and as best illustrated in the enlarged portion of FIG. 3b, the outwardly facing gear teeth arrangement 112 of the bearing inner ring 108 is arranged in meshed connection with the inwardly facing gear teeth arrangement 114 of the clutch arrangement 104. Accordingly, the inwardly facing gear teeth arrangement 114 of the clutch arrangement 104 is arranged in meshed connection with the outwardly facing input shaft gear teeth arrangement 116 as well as the outwardly facing gear teeth arrangement 112 of the bearing inner ring 108.

The outwardly facing gear teeth arrangement 112 of the bearing inner ring 108 is preferably forming an axially arranged inner portion 124 of the bearing inner ring 108, i.e. the axially arranged inner portion 124 is forming a part of the longitudinally extending elongated portion 110. The longitudinal extension 220 of the axially inner portion 124 may preferably form between 25% and 50% of the total longitudinal extension of the bearing inner ring 108. Other ranges are of course conceivable and depend, for example, on the specific vehicle transmission and its dimensions, etc.

By means of the connection between the outwardly facing gear teeth arrangement 112 of the bearing inner ring 108 and the inwardly facing gear teeth arrangement 114 of the clutch arrangement 104, the relative rotation between the bearing inner ring 108 and the input shaft 102 is prevented. Hereby, wear of components will be reduced.

Figure 4A:
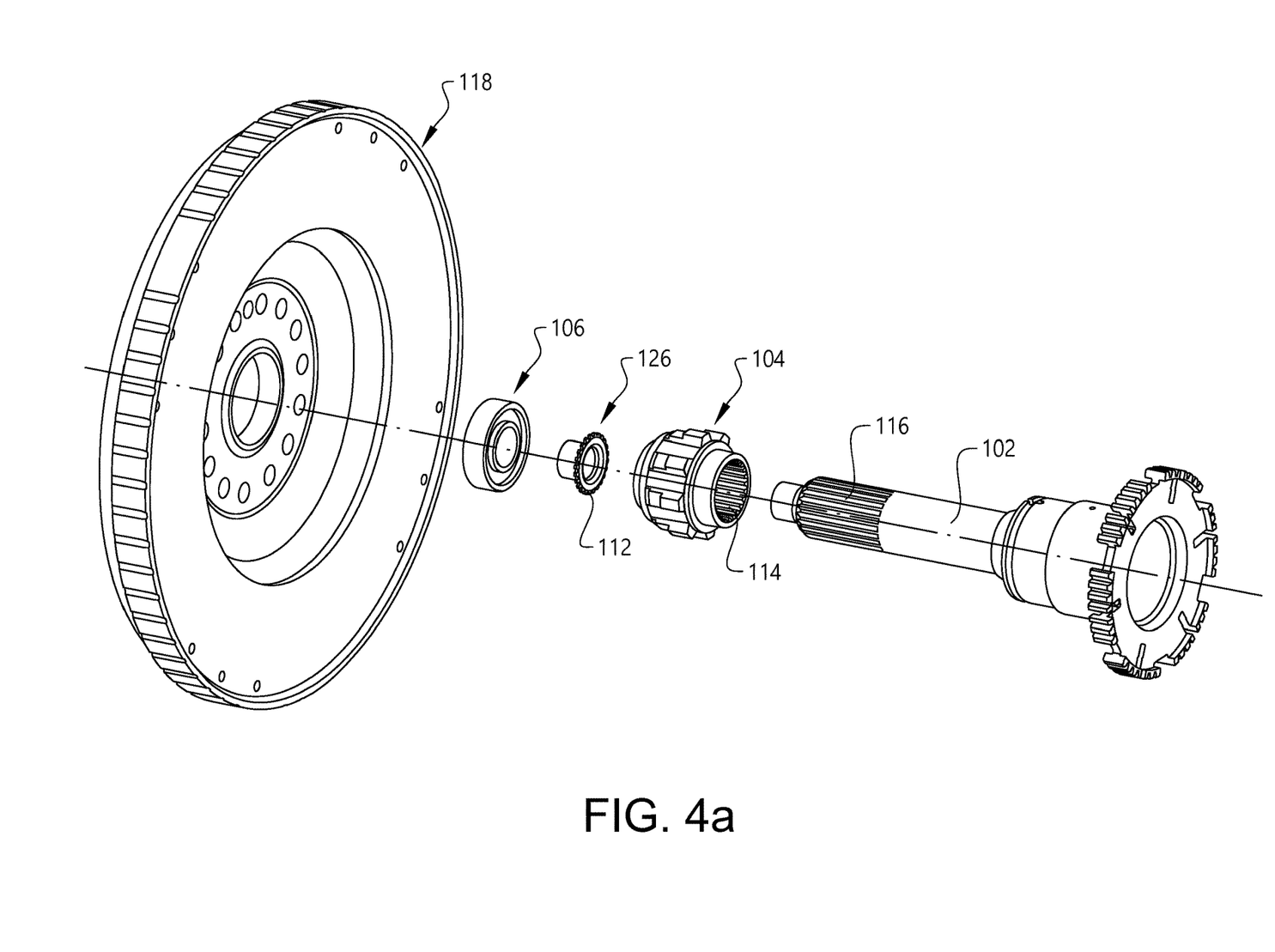
FIGS. 4a-4b illustrate a transmission input shaft arrangement according to another example embodiment.
Figure 4B:
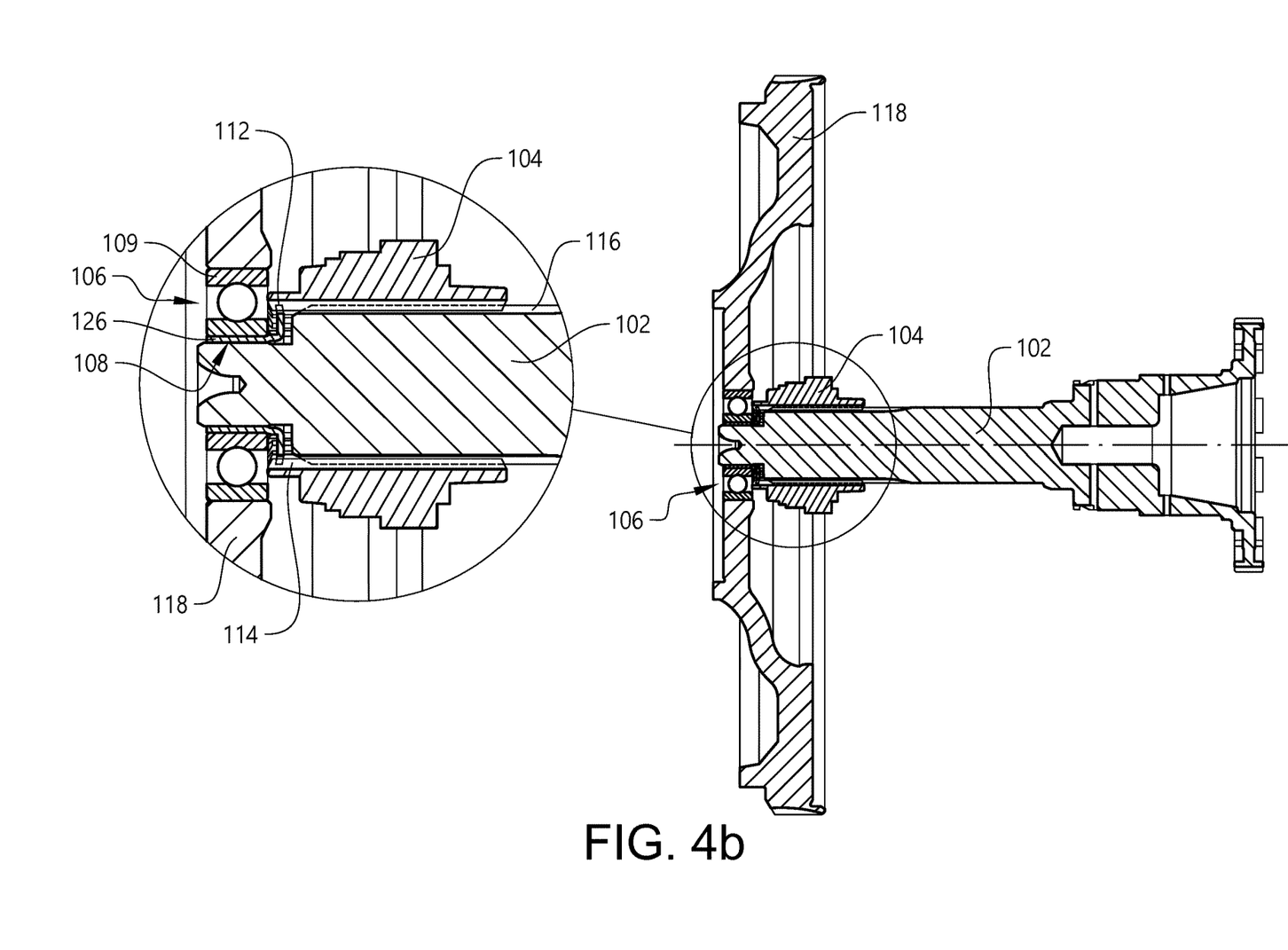

Reference is now made to FIGS. 4a-4b, where FIG. 4a is an exploded view of the transmission input shaft arrangement 100 according to a second example embodiment, and where FIG. 4b is a cross-section of the transmission input shaft arrangement 100 in FIG. 4a in an assembled configuration. The following will only describe the differences between the first and second embodiments.

With particular reference to the enlarged portion of FIG. 4b, the bearing inner ring 108 is connected to a longitudinally extending sleeve portion 126. The longitudinally extending sleeve portion 126 is thus a separate component which is connected to the bearing inner ring 108. The longitudinally extending sleeve portion 126 is preferably tightly connected to an inner surface of the bearing inner ring 108, preferably press-fitted to the bearing inner ring 108. Hereby, a standard bearing can be used, which can be connected to the longitudinally extending sleeve portion 126 before connection to the input shaft 102. Hereby, the bearing inner ring 108 will be rotationally connected to the clutch arrangement 104 via the longitudinally extending sleeve portion 126. Accordingly, instead of the above described longitudinally extending elongated portion of the bearing inner ring 108, such longitudinal extension is formed by the longitudinally extending sleeve portion 126. Hence, the outwardly facing gear teeth arrangement 112 is arranged on the longitudinally extending sleeve portion 126 and numbered similar as the above outwardly facing gear teeth arrangement 112 of the bearing inner ring 108.

By means of the arrangement depicted in FIGS. 4a-4b, a similar connection between the bearing arrangement 106 and the clutch arrangement 104 as described above in relation to FIGS. 3a-3b is achieved, thus preventing the relative rotation between the bearing inner ring 108 and the input shaft 102. The longitudinally extending sleeve portion 126 may also be advantageously used for connecting the clutch arrangement correctly, i.e. at a correct centralized position to the flywheel arrangement, such that the input shaft can be connected to the bearing inner ring. Hence, no additional tool for such operation may be required by use of the longitudinally extending sleeve portion 126.

It is to be understood that the present invention is not limited to the embodiments described above and illustrated in the drawings; rather, the skilled person will recognize that many changes and modifications may be made within the scope of the appended claims.

The invention claimed is:

1. A transmission input shaft arrangement for a vehicle transmission, the transmission input shaft arrangement comprising: an input shaft; a clutch arrangement connected to the input shaft and controllable between a first state in which the input shaft is drivingly connected to an output shaft of a prime mover, and a second state in which the input shaft is disconnected from the output shaft of the prime mover, wherein the input shaft comprises an outwardly facing input shaft gear teeth arrangement arranged in meshed connection with an inwardly facing gear teeth arrangement of the clutch arrangement; and a bearing arrangement comprising a bearing inner ring connected to the input shaft and arranged at a position spaced apart from the clutch arrangement in a longitudinal direction of the input shaft, wherein the bearing inner ring is rotationally connected to the clutch arrangement by connecting the bearing inner ring to the inwardly facing gear teeth arrangement of the clutch arrangement.

2. The transmission input shaft arrangement according to claim 1, further comprising a vehicle flywheel arrangement, the flywheel arrangement being connectable to the output shaft of the prime mover and arranged to transmit a torque from the output shaft of the prime mover to the input shaft via the clutch arrangement.

3. The transmission input shaft arrangement according to claim 2, wherein the bearing arrangement is connected between the input shaft and the vehicle flywheel arrangement.

4. The transmission input shaft arrangement according to claim 2, wherein the bearing arrangement comprises a bearing outer ring, the bearing outer ring being press-fitted to the vehicle flywheel arrangement.

5. The transmission input shaft arrangement according to claim 1, wherein the bearing inner ring comprises a longitudinally extending elongated portion extending from an outer end portion of the input shaft to a position below a portion of the clutch arrangement as seen in a radial direction, wherein the longitudinally extending elongated portion comprises an outwardly facing gear teeth arrangement arranged in meshed connection with an inwardly facing gear teeth arrangement of the clutch arrangement.

6. The transmission input shaft arrangement according to claim 5, wherein the outwardly facing gear teeth arrangement of the bearing inner ring is forming an axially arranged inner portion of the bearing inner ring, wherein a longitudinal extension of the axially arranged inner portion forms less than 50% of a longitudinal extension of the bearing inner ring.

7. The transmission input shaft arrangement according to claim 6, wherein the longitudinal extension of the axially arranged inner portion forms at least 25% of the longitudinal extension of the bearing inner ring.

8. The transmission input shaft arrangement according to claim 5, wherein the outwardly facing gear teeth arrangement and the inwardly facing gear teeth arrangement of the clutch arrangement comprises respective gear teeth, wherein each gear tooth is formed in a spline shaped configuration.

9. The transmission input shaft arrangement according to claim 1, wherein the bearing arrangement is positioned at an outer end position of the input shaft.

10. The transmission input shaft arrangement according to claim 1, wherein the bearing inner ring is non-fixedly connected to the input shaft for allowing a mutual rotation between the inner bearing and the input shaft.

11. The transmission input shaft arrangement according to claim 1 further comprising a longitudinally extending sleeve portion connected to the bearing inner ring, wherein the longitudinally extending sleeve portion comprises an outwardly facing gear teeth arrangement arranged in meshed connection with a second inwardly facing gear teeth arrangement of the clutch arrangement.

12. The transmission input shaft arrangement according to claim 11, wherein the longitudinally extending sleeve portion is press-fitted to the bearing inner ring.

13. The vehicle comprising the vehicle transmission and the prime mover arranged to provide a propelling torque to the vehicle transmission, wherein the vehicle transmission comprises the transmission input shaft arrangement according to claim 1.

\* \* \* \* \*